March 4, 1924.
W. H. BROWN
LOW PRESSURE ALARM
Original Filed May 5, 1923    2 Sheets-Sheet 1
1,486,010
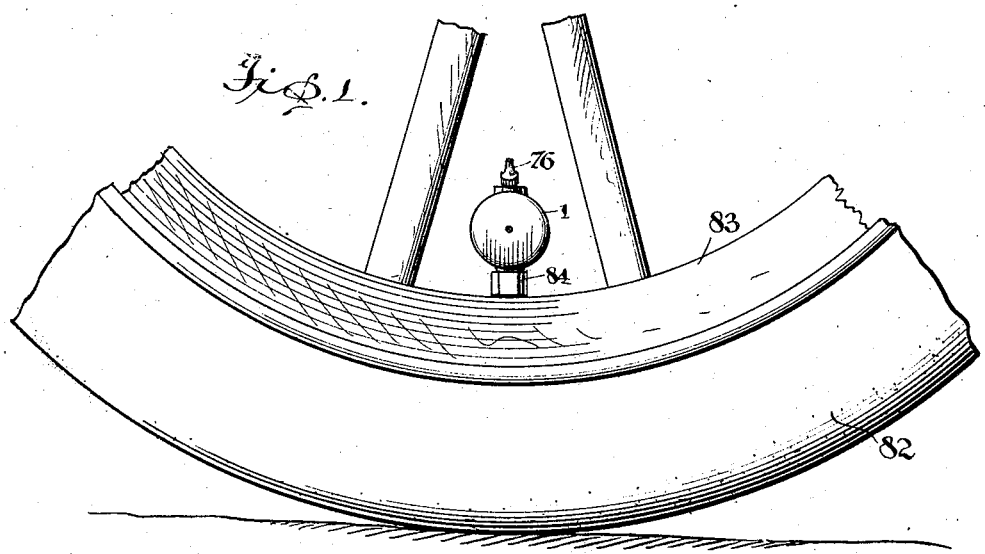
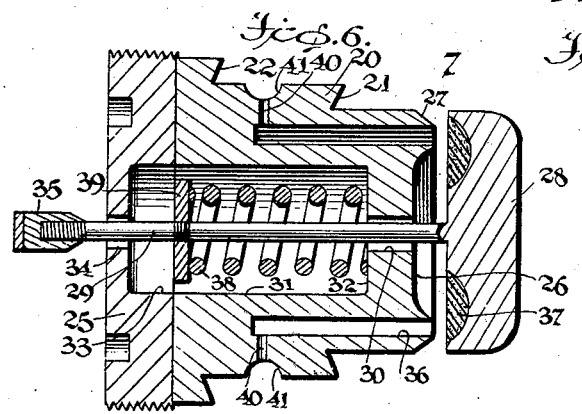
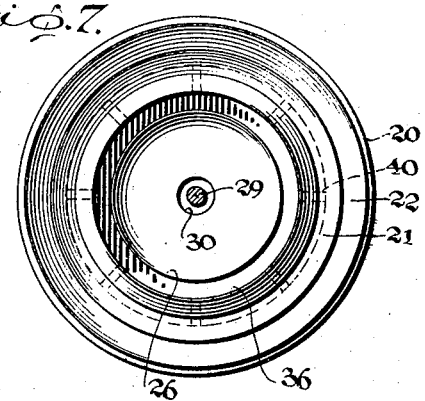
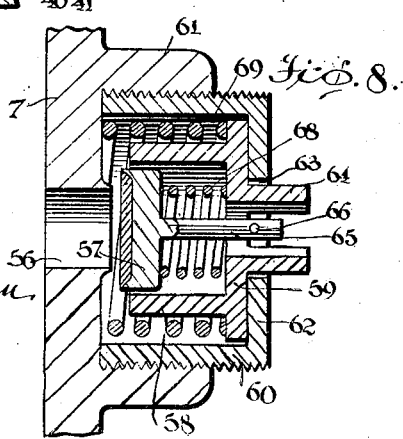
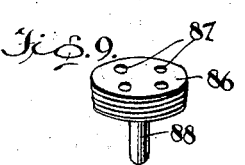
WITNESSES
INVENTOR
W. H. Brown,
BY
ATTORNEYS March 4, 1924.
W. H. BROWN
LOW PRESSURE ALARM
Original Filed May 5, 1923   2 Sheets-Sheet 2
1,486,010
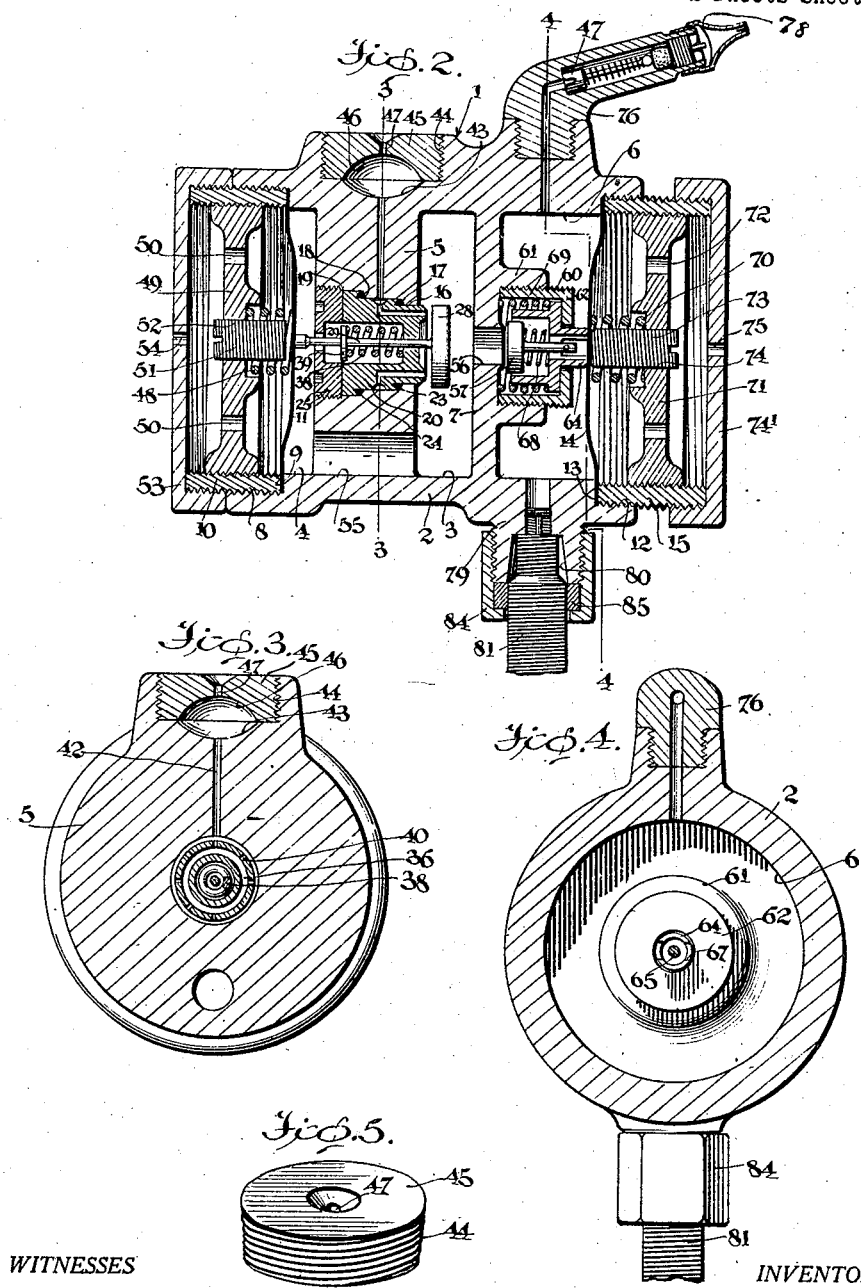
WITNESSES
INVENTOR
W. H. Brown,
BY
ATTORNEYS Patented Mar. 4, 1924.

1,486,010

UNITED STATES PATENT OFFICE.

WALTER HENRY BROWN, OF PASADENA, CALIFORNIA.

LOW-PRESSURE ALARM.

Application filed May 5, 1923, Serial No. 636,883. Renewed January 21, 1924.

*To all whom it may concern:*

Be it known that I, WALTER H. BROWN, a citizen of the United States, and resident of Pasadena, in the county of Los Angeles and State of California, have invented certain new and useful Improvements in Low-Pressure Alarms, of which the following is a specification.

My invention relates generally to low pressure alarms for pneumatic tires, more particularly to low pressure alarms of the type which includes means for controlling the flow of pressure from the tire through the alarm so that air will be permitted to escape from the alarm to give an audible signal when a predetermined low pressure has been reached in the tire, the signal being sounded continuously until a still lower pressure has been reached, whereupon the escape of further pressure from the tire through the alarm is stopped, and it consists in the combinations, constructions and arrangements herein described and claimed.

An object of the present invention is to provide a low pressure alarm of the character described which employs a valve for controlling the flow of pressure fluid from the tire or like source of supply to a means for sounding an alarm and a diaphragm associated with the valve but unconnected with the valve, the diaphragm being adapted when it is flexed in one direction to effect movement of the valve in one direction relatively to the seat for the valve and to move freely away from the valve when the diaphragm is flexed in the opposite direction, whereby the flexure of the diaphragm will not be detrimentally affected by the action of the valve thereon, as is the case when the valve is attached to the diaphragm, as is usual in diaphragm controlled valve constructions.

A further object of the invention is to provide a low pressure alarm of the character described in which the pressure on the valve which is adapted to be moved to closed position when a diaphragm controlling the valve is flexed in one direction remains constant after a predetermined pressure has been placed on the valve, irrespective of the additional pressure on the diaphragm.

Other objects and advantages will be apparent from the following description, considered in conjunction with the accompanying drawings, in which—

Figure 1 is a fragmentary side elevation of a portion of the rim structure of a wheel having a pneumatic tire mounted thereon equipped with a low pressure alarm embodying the invention, Figure 2 is a longitudinal vertical section through the low pressure alarm, Figure 3 is a section along the line 3—3 of Figure 2, Figure 4 is a section along the line 4—4 of Figure 2, Figure 5 is a perspective view showing the whistle plug comprised in the device, Figure 6 is a longitudinal vertical section through a valve which is comprised in the device, Figure 7 is a section along the line 7—7 of Figure 6, Figure 8 is a longitudinal vertical section through a second valve comprised in the device, and Figure 9 is a perspective view showing a pin which is adapted to be embodied in the device in position to cooperate with the usual valve in a tire stem.

Referring now to the drawings and particularly to Figure 2 thereof, it is to be observed that a practical embodiment of the invention comprises a casing designated generally at 1, the casing comprising a substantially cylindrical main or intermediate section 2 having therein a middle chamber 3 divided from one end chamber 4 by a transverse partition 5 and from a second end chamber 6 by a transverse partition 7. The chamber 4 is counterbored adjacent to its outer end as indicated at 8, thus defining an annular shoulder 9 on the inner wall of the chamber, the counterbored portion of the chamber being provided with screw threads for engaging screw threads on the outer wall of a ring 10 which functions to clamp the outer edge portion of a diaphragm 11 against the shoulder 9.

The chamber 6 also is counterbored adjacent to its outer end as indicated at 12, thus defining an annular shoulder 13 against which the marginal edge portions of a diaphragm 14 are clamped by the inner end of a ring 15 having screw threads on its outer wall in engagement with screw threads on the wall of the counterbore 12. An axial bore 16 extending through the partition 5 is enlarged at 17, further enlarged at 18, and still further enlarged at 19, the area thereof being greatest at the end proximate to the diaphragm 11. A valve seat 20 having the form best seen in Figure 6 is adapted to interfit the bore 16 and is provided with external annular shoulders 21 and 22 respectively adapted to cooperate respectively with the shoulders formed on the wall of the bore at 17 and 18 to clamp compressible gaskets 23 and 24 respectively between the wall of the bore 16 and the outer wall of the valve casing 20, thus providing an air tight joint between the bore 16 and the valve casing 20. The valve casing 20 is held in clamping relation to the gaskets 23 and 24 and in inserted position in the bore 16 by a retaining plug 25 which threadedly engages the end of the bore 16 which is proximate to the diaphragm 11.

The valve casing 20 is provided with a central recess or depression 26 in the end wall thereof remote from the diaphragm 11, the recess or depression 26 being circular in configuration and being of less area than the end wall of the valve casing whereby an annular valve seat 27 is provided at the end of the valve casing 20 remote from the diaphragm 11. A valve disk 28 is integral with or rigidly connected to a valve stem 29 which extends slidably through an axial bore 30 of the valve casing, a counterbore 31 into which the bore 30 is merged by a shoulder 32, a counterbore 33 in the inner end of the plug 25 and a bore 34 which extends from the inner end of the counterbore 33 through the wall of the plug 25 which is proximate to the diaphragm 11. The valve disk 28 thus is disposed within the chamber 3 while the valve stem 34 terminates in the chamber 4 in close proximity to the diaphragm 11, preferably being provided at its free end with a cap 35 having the face thereof confronting the diaphragm substantially flat, as shown. The diameter of the valve disk 28 is such that an annular passage 36 extending longitudinally of the valve casing 20 from the valve seat 27 for part of the length of the valve casing will be closed at its outer end by the valve disk when the latter has been moved against the valve seat. An annular ring 37 made of a compressible material, such as rubber, may be inset or countersunk in the inner face of the valve disk in confronting relation to the outer end of the annular passage 36 for engagement with the valve seat to effectually close the outer end of the passage 36. The valve disk 28 is urged toward the position to engage with the seat 27 and to thus close the passage 36 at the outer end of the latter by an expansion spring 38 which reacts at one end against the shoulder 32 and at its other end against a disk or pin 39 which is secured to the valve stem 29 and is free to move within the aligned counterbores 31, 33. When the valve disk 28 is in engagament with the valve seat 27, the cap 35 at the free end of the valve stem 29 will be in abutting relation to the diaphragm 11 at the approximate center of the latter. The annular passage 36 is in open communication adjacent to its inner end through a plurality of radial passages 40 with an annular groove 41 in the outer periphery of the valve casing 20. The annular groove 41 is in communication through a passage 42 extending radially in the partition 5 to a depression or concavity 43 in the bottom wall of a socket 44 formed in the outer wall of the main section 2 of the casing 1. A whistle plug 45 threadedly interfitting the socket 44 has a depression or cavity 46 in its inner wall in registry with the concavity 43 and an orifice 47 of relatively reduced diameter leads from the bottom of the cavity 46 through the plug 45 and is open at its outer end to the atmosphere.

An expansion spring 48 is disposed between an adjusting plug 49 which threadedly interfits the ring 10 and the diaphragm 11 and tends to flex the diaphragm 11 toward the partition 5 and to thus cause the valve stem 29 to be pushed in the direction opposite the adjusting plug 49 and the valve disk 28 thus held from position to close the annular passage 36. The tension placed on the diaphragm 11 by the spring 48 may be varied by manipulating the adjusting plug 49 which is provided with openings 50 extending therethrough and adapted to be engaged by a suitable tool. A stop pin 51 in threaded engagement with a central opening 52 through the adjusting plug 49 can be adjusted in respect to the plug 49 to limit the flexure of the diaphragm 11 toward the plug 49, as desired. The casing 1 may include a cap 53 in threaded engagement with the extending outer end portion of the ring 10 and closing the latter, the cap being provided with an orifice 54 through the head thereof for a purpose to be hereinafter described.

The chamber 3 is in open communication with the chamber 4 through a passage 55 extending through the partition 5.

The partition 7 has a central opening 56 which is adapted to be controlled by a valve 57 which is freely movable axially within the cylindrical portion 58 of a valve holder or guide having a head 59 extending radially beyond the outer wall of the cylindrical portion 58 and being slidably received within the cylindrical portion 60 of a valve casing which threadedly interfits a tubular boss 61 extending into the chamber 6 from the partition 7 in concentric encircling relation to the opening 56. The valve casing just mentioned also includes a head 62 which constitutes a stop for limiting the movement of the holder in the direction opposite the partition 7. The head 62 provided with a central opening 63 through which a tubular central extension 64 to the head of the valve holder extends. The bore of the tubular extension 64 extends through the head 59 of the valve holder and provides a guide-way in which a stem 65 which is integral with the valve 57 or rigidly connected with the latter slides. A transverse stop pin 66 carried by the valve stem 65 works in a slot 67 in the tubular extension 64 and is adapted to engage with the bottom of the slot 67 to limit the movement of the valve 67 toward the partition 7 and relatively to the valve holder. An expansion spring 68 encircling the stem 67 between the valve 57 and the head 59 tends to urge the valve 57 toward position to abut the partition 7 and close the opening 56 through the latter. An expansion spring 69 encircling the cylindrical portion of the valve holder reacts against the outwardly extending edge portion of the head of the latter and against the partition 7 to urge the valve holder against the head 62 of the valve casing. The arrangement is such that the valve 57 will protrude beyond the inner end of the cylindrical portion 58 of the valve holder but will still be held from position to engage with the partition 7 when the head 59 of the valve holder is held against the head 62 of the valve casing, as shown in Figures 2 and 8 of the drawings. When the valve holder is in the position just described, the outer end of the tubular extension 64 will be disposed in abutting relation to the diaphragm 14. An expansion spring 70 arranged between an adjusting plug 71 which threadedly interfits the ring 15 and the diaphragm 14 reacts against the latter and tends to flex it toward the valve casing and to thus cause the valve holder to slide in the valve casing toward the partition 7. The force exerted on the diaphragm 14 may be varied by adjusting the position of one along the ring 15, the plug 71 being provided with openings 72 which are adapted to be engaged by a suitable wrench or tool. A screw threaded stop pin 73 in threaded engagement with a central opening 74 through the plug 71 provides a means for limiting the flexure of the diaphragm 14 toward the plug.

A cap 74 having an orifice 75 through the head thereof threadedly engages the extending outer end portion of the ring 15 and closes the outer end of the latter.

The main section 2 of the casing is provided with an inlet leading to the chamber 6 and being adapted for connection with any usual means for forcing a pressure fluid therethrough into the chamber 6.

The inlet 76 is controlled by the usual Schrader valve 77 and may be provided at its outer end with a cap 78. The main section 2 of the casing also has an outlet in the form of a nipple 79, the bore of which is in communication at its inner end with the chamber 6. The bore of the nipple 79 may be enlarged adjacent to its outer end as indicated at 80 to receive the end portion of the usual valve stem 81 for a pneumatic tire, such as that designated 82 in Figure 1 and shown as being mounted on the felloe of a wheel. A union nut 84 serves to lock the stem 81 and the nipple 79 to each other, a compressible gasket 85 preferably being disposed in the outer end of the nipple and the union nut so that leakage of pressure fluid from the stem to the union nut is precluded.

In order to obviate the necessity of removing the usual Schrader valve from the stem 81, I make use of a threaded disk or plug 86 which is perforated at 87 and is adapted to threadedly interfit the bore of a nipple 79 in abutting relation to the outer end of the stem 81. The disk or plug 86 carries a pin projection 88 which extends into the bore of the stem 81 and is adapted to engage with the usual Schrader valve in the latter in such manner as to hold the Schrader valve open. The interior of the valve stem 81 thus will be in communication with the chamber 6 so long as the nipple 79 is secured to the stem 81 in the manner described.

From the foregoing description of the various parts of the device, the operation thereof may be readily understood. When it is desired to inflate the tire 82, the inlet 76 is attached to the usual service connection and a fluid is forced under pressure through the chamber 6 and through the outlet 79 into the tire stem and thence to the valve. When the tire is in deflated condition, the valve 57 will be held closed and the valve 28 will be held in open condition as illustrated in Figure 2 by virtue of the action of the diaphragms 14 and 11, which are flexed by the springs 70 and 48 respectively. In some instances, the springs 70 and 48 may be dispensed with as the inherent resiliency of the material composing the diaphragms 14 and 11 will cause them to assume the flexed position shown in Figure 2 when the pressure within the tire is below a predetermined pressure.

At the beginning of the operation of inflating the tire, the pressure fluid from the inlet will pass through the chamber 6 into the outlet 79 and thence to the tire. Since the valve 57 is closed at this time, the pressure fluid cannot pass through the opening 56 and the alarm therefore is not sounded although the valve 28 is open. When the pressure within the tire and within the chamber 6 has built up to an extent sufficient to flex the diaphragm 14 against the action of the spring 70, the spring 69 will function to open the valve 57 and the pressure fluid will rush through the opening 56 and through the passage 55 against the diaphragm 11, thereby flexing the latter and permitting the spring 38 to function to move the valve 28 to closed position. The finger of a hand may be placed over the orifice of the whistle plug 45 at this time if it is desired to prevent the escape of the slight amount of pressure fluid which would pass through the whistle plug before the valve 28 closes.

After the tire has been inflated, the valve 57 will remain open and the valve 28 will remain closed until a predetermined low pressure has been reached in the tire, because of the presence of a leak in the tire or for other cause. The resistance of the pressure fluid acting on the diaphragm 11 and opposing the action of the spring 48 will then no longer be sufficient to overcome the action of the spring 48 and the diaphragm 11 will be flexed inwardly, thus effecting movement of the valve stem 29 toward the partition 7 and moving the valve 28 from its seat. the escaping pressure fluid will be emitted from the orifice of the whistle plug at a high velocity and will cause a whistling sound which will give warning to the operator of the condition of the tire. The escape of pressure fluid through the whistle plug will continue until a still lower predetermined pressure has been reached, at which time the diaphragm 14 is permitted to flex inwardly in response to the actuation of the spring 70 and the valve holder will be pushed before the inwardly flexed diaphragm until the inner end of the cylindrical portion 58 abuts the partition 7. Just prior to the time at which the cylindrical portion 58 abuts the partition 7, the valve 57 will be moved against the partition 7 and in closing relation to the opening 56.

It will be apparent that the only pressure on the valve 57 tending to hold the latter in closed position is the pressure resulting from the action of the expansion spring 58, whereby the valve 57 will not be subjected to excessive pressure which might cause injury to the face of the valve which is moved in contact with the valve seat at the adjacent end of the opening 56 and which otherwise probably would result from the high pressure on the valve holder occasioned by the action of the spring pressed diaphragm 14 thereagainst.

It also is to be observed that the diaphragms 11 and 14 are not connected with the valves which are operated thereby when the diaphragms are flexed inwardly and therefore the diaphragms are permitted to flex outwardly in response to the action of the pressure fluid from the tire thereon without having the flexure thereof retarded by the valves, as would otherwise occur were the diaphragms connected to the valves, as is usual in diaphragm operated valve constructions. The movement of the diaphragm 70 will thus be more uniform when the diaphragms are acted on by given forces than is possible when the diaphragms are attached to the valves controlled thereby. The plugs 49 and 71 are provided with openings therethrough and each of the caps 53 and 74 is provided with an orifice, whereby the formation of air cushions between the outer faces of the diaphragms and the plugs and caps at the corresponding ends of the casing 1 is precluded.

Obviously, my invention is susceptible of embodiment in forms other than that illustrated in the accompanying drawings and I therefore consider as my own all modifications and adaptations of the form of the device herein disclosed which fairly fall within the scope of the appended claims.

I claim:—

1. In a low pressure alarm, a casing adapted for connection with a source of pressure supply and having an outlet, an alarm adapted to be actuated by pressure passing outwardly from the outlet, a valve movably supported within the casing for controlling communication between the source of pressure and the outlet, and a diaphragm for moving the valve in one direction, said diaphragm being in abutting relation to a movable part of the valve and being free from the latter.

2. In a device of the character described, a casing attachable to a source of pressure and having an outlet, an alarm adapted to be actuated by pressure passing outwardly from the outlet, a valve controlling communication between the source of pressure and the outlet, said valve including a movable valve disk, and a diaphragm supported within the casing and adapted when flexed in one direction to abut a movable part of the valve and to effect bodily movement of the valve disk, said diaphragm being free from the valve.

3. In a device of the character described, a casing having a lateral tubular extension adapted for connection with a tire valve stem and having an outlet remote from the tubular extension, a valve disposed within the casing for controlling the flow of pressure fluid from the tire valve stem to the outlet, and a perforated disk adjustably supported in the lateral tubular extension and having a pin extension adapted to enter the tire valve stem and to engage with the usual valve in the latter.

4. In a device of the character described, a casing having a lateral tubular connection attachable to a source of pressure and having an outlet, a partition within the casing between the source of pressure and the outlet, said partition having an opening, and a valve controlling said opening, spring pressed means tending to hold said valve in open position, other inherently actuated resilient means tending to move the valve to closed position, said last named resilient means being of greater strength than the first named spring means and including a diaphragm in abutting relation to a movable part of the valve, said diaphragm being free from the valve, said last named resilient means being adapted to yield in response to a definite pressure from the source acting on said diaphragm.

5. In a device of the character described, a casing having a lateral tubular connection attachable to a source of pressure and having an outlet, a partition within the casing between the source of pressure and the outlet, said partition having an opening, and a valve controlling said opening, spring pressed means tending to hold said valve in open position, other inherently actuated resilient means tending to move the valve to closed position, said last named resilient means being of greater strength than the first named spring means and including a diaphragm in abutting relation to a movable part of the valve, said diaphragm being free from the valve said last named resilient means being adapted to yield in response to a definite pressure from the source acting on said diaphragm, a second valve controlling communication between the first valve and the outlet, spring means tending to hold said second valve in closed position, other resilient means tending to hold the second valve in open position and including a diaphragm, said last named resilient means being stronger than the spring means for the second valve and being adapted to yield at a definite pressure against the diaphragm, said last named pressure being lower than at which the corresponding resilient means for the first valve is adapted to yield.

6. In a device of the character described, a valve casing, a valve movable relatively to the casing and having a rigid valve operating member extending beyond one end of the casing, and a diaphragm supported in abutting relation to the extending end of the valve operating member and adapted when flexed in one direction to push the valve operating member bodily, said diaphragm being free from the valve operating member.

7. In a device of the character described, a casing having a wall provided with an opening and having a tubular boss extending within the casing laterally of one side of the wall in spaced concentric relation to the opening, a valve holder having a cylindrical portion secured in the boss and having a head at its end remote from the wall, the end of the valve holder proximate to said wall being open and said head having an opening in axial alignment with the opening in the wall, a valve casing having a head slidably interfitting the valve holder and having a cylindrical portion extending within the holder, said valve casing being adapted to move longitudinally of the valve holder, being provided with an opening in the head thereof in axial alinement with the opening in the wall of said first named casing and having a tubular boss extending from the outer face of the head through the opening in the head of the valve holder, said last named boss having a lateral slot extending longitudinally thereof, a valve for controlling the opening in the first named casing, said valve having a stem extending through the opening in the head of the valve casing into the last named boss, a transverse pin carried by the stem for engaging the inner end of the slot in the last named boss to limit the movement of the valve in the direction opposite the head of the valve casing and toward position to close the opening in the first named casing, an expansion spring urging said valve in said direction, and a second expansion spring urging said valve casing away from said wall of the first casing.

WALTER HENRY BROWN.